United States Patent
Peisa et al.

(10) Patent No.: US 11,240,769 B2
(45) Date of Patent: Feb. 1, 2022

(54) SYSTEM INFORMATION FOR NARROWBAND

(71) Applicant: Telefonaktiebolaget LM Ericsson (publ), Stockholm (SE)

(72) Inventors: Janne Peisa, Espoo (FI); Johan Bergman, Stockholm (SE); Pål Frenger, Linköping (SE); Asbjörn Grövlen, Stockholm (SE); Riikka Susitaival, Helsinki (FI); Stefan Wager, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/347,265

(22) PCT Filed: Nov. 3, 2017

(86) PCT No.: PCT/IB2017/056891
§ 371 (c)(1),
(2) Date: May 3, 2019

(87) PCT Pub. No.: WO2018/083660
PCT Pub. Date: May 11, 2018

(65) Prior Publication Data
US 2019/0261295 A1  Aug. 22, 2019

Related U.S. Application Data

(60) Provisional application No. 62/417,747, filed on Nov. 4, 2016.

(51) Int. Cl.
*H04W 56/00* (2009.01)
*H04W 4/70* (2018.01)
(Continued)

(52) U.S. Cl.
CPC .......... *H04W 56/001* (2013.01); *H04B 1/713* (2013.01); *H04L 1/1819* (2013.01);
(Continued)

(58) Field of Classification Search
CPC .. H04W 4/70; H04W 28/0215; H04L 5/0023; H04L 5/0092; H04L 5/0094;
(Continued)

(56) References Cited

U.S. PATENT DOCUMENTS

2015/0078300 A1* 3/2015 Xu .................. H04W 52/16
370/329
2015/0181575 A1* 6/2015 Ng .................. H04W 72/042
370/329
(Continued)

FOREIGN PATENT DOCUMENTS

CN  105122715 A  12/2015
CN  105557039 A  5/2016
(Continued)

OTHER PUBLICATIONS

3GPP TSG-RAN WG1 Meeting #87; Reno, Nevada, USA; Source: Ericsson; Title: System information for low complexity and extended coverage (R1-1611902)—Nov. 14-18, 2016.
(Continued)

*Primary Examiner* — Elton Williams
(74) *Attorney, Agent, or Firm* — Baker Botts, LLP

(57) ABSTRACT

According to some embodiments, a method for use in a user equipment (UE) of acquiring system information or a synchronization signal comprises receiving, from a network node, a plurality of subframes. Each subframe includes a repetition of either system information or a synchronization signal. The repetition is divided into a number (N) of transmission blocks in a frequency domain of a first bandwidth (N>1). The method further comprises combining N
(Continued)

transmission blocks from one or more repetitions of the respective received plurality of subframes to decode the system information or synchronization signal. The UE may comprise a narrowband wireless device operable to receive a bandwidth less than the first bandwidth, and combining N transmission blocks to decode the system information or synchronization signal may comprise combining at least one transmission block from two or more repetitions of two or more respective subframes of the plurality of subframes.

26 Claims, 8 Drawing Sheets

(51) Int. Cl.
- *H04B 1/713* (2011.01)
- *H04L 1/18* (2006.01)
- *H04W 72/04* (2009.01)
- *H04W 48/12* (2009.01)

(52) U.S. Cl.
CPC ............. *H04W 4/70* (2018.02); *H04W 48/12* (2013.01); *H04W 72/0446* (2013.01); *H04W 72/0453* (2013.01)

(58) Field of Classification Search
CPC ....... H04L 5/0095; H04L 1/08; H04L 1/1819; H04L 1/189; H04B 1/713
See application file for complete search history.

(56) References Cited

U.S. PATENT DOCUMENTS

| | | | |
|---|---|---|---|
| 2016/0295345 A1* | 10/2016 | Oh | H04W 48/12 |
| 2017/0272976 A1* | 9/2017 | Yang | H04L 27/2613 |
| 2017/0318478 A1* | 11/2017 | Basu Mallick | H04L 5/0091 |
| 2018/0048346 A1* | 2/2018 | Park | H04L 5/003 |
| 2018/0109344 A1* | 4/2018 | Ly | H04J 11/00 |

FOREIGN PATENT DOCUMENTS

| | | |
|---|---|---|
| CN | 105745848 A | 7/2016 |
| EP | 3 047 685 A1 | 7/2016 |
| EP | 3 082 366 A1 | 10/2016 |
| WO | 2015066645 A1 | 5/2015 |

OTHER PUBLICATIONS

PCT International Search Report for International application No. PCT/IB2017/056891—dated Jan. 8, 2018.
PCT Written Opinion of the International Searching Authority for International application No. PCT/IB2017/056891—dated Jan. 8, 2018.
Chinese Office Action issued for Application No. 201780082328.4—dated Dec. 24, 2020.
3GPP TSG RAN WG1#66bis; Zhuhai, China; Source: Huawei, HiSilicon, CMCC; Title: Overview on low-cost MTC UEs Based on LTE (R1-112912)—Oct. 10-14, 2011.
3GPP TSG RAN WG1 Meeting #84; St. Julian's, Malta; Source: Lenovo; Title: Discussion on NB-IoT multi-carrier operation (R1-161008)—Feb. 15-19, 2016.

* cited by examiner

SYSTEM INFORMATION FOR NARROWBAND

PRIORITY

This nonprovisional application is a U.S. National Stage Filing tinder 35 U.S.C. 6; 371 of international Patent Application Serial No, PCT/IB2017/056891 filed Nov. 3, 2017 and entitled "System Information for Narrowband" which claims priority to US, Provisional Patent Application No. 62/417,747 flied Nov. 4, 2016 both of which are hereby incorporated by reference in their entirety.

TECHNICAL FIELD

This disclosure relates generally to wireless communications, and more specifically, to delivery of system information (SI) for narrowband user equipment (UEs) and extended coverage.

INTRODUCTION

Third Generation Partnership Project (3GPP) 5G new radio (NR) natively supports low-complexity user equipment (UEs) and extended coverage operation. This is relevant to the system information design for NR, because system information and initial access are not as easy to modify or enhance in later releases compared to, for example, features requiring primarily dedicated signaling.

One feature of low-complexity UEs is support for narrow bandwidth operation, captured in the design guidelines for control plane protocols and system information published in 38.804. Some guidelines include: (a) most essential functions (e.g., initial system access) should be future proof and designed to be common to various different use cases and services; (b) system information distribution should target a single technical framework, ensuring a future proof solution and smooth introduction of new services and features; and (c) system information distribution in NR should be designed such that UEs supporting less than the carrier bandwidth can determine at least the minimum system information.

Comparing the guidelines to recent RAN1 working assumptions on physical broadcast channel (PBCH) bandwidth indicates that an intention to support a PBCH bandwidth wider than for long term evolution (LTE). For example, some assumptions include: (a) wider transmission bandwidth for NR-PSS (Primary Synchronization Signal)/SSS (Secondary Synchronization Signal) and/or PBCH than that for LTE-PSS/SSS/PBCH is supported at least for a subcarrier spacing larger than 15 kHz; (b) below 6 GHz, transmission bandwidth containing NR-PSS/SSS/PBCH is not more than [5 or 20] MHz; and (c) below 40 GHz, transmission bandwidth containing NR-PSS/SSS/PBCH is not more than [40 or 80] MHz.

Another feature that impacts the system information design for enhanced machine type communication (eMTC) and narrowband Internet-of-things (NB-IoT) systems is support for extended coverage operation. Designs for eMTC reuse legacy master information block (MIB) schedules. A UE can acquire and decode MIB by receiving multiple repetitions of it.

Compared to legacy system, however, system information block 1 (SIB1) and other SIBs are not scheduled with the Physical Downlink Control Channel (PDCCH). Instead, scheduling information (e.g., transport block size (TBS)) of SIB1 is given in MIB and scheduling information of other SIBs are given in SIB1.

In addition, eMTC includes a new version of SIB1, called SIB1 bandwidth reduced (SIB1-BR). The contents of SIB1-BR are similar to the contents of legacy SIB1, but it contains some additional parameters. Contents of the other SIBs are reused for eMTC, but eMTC extends the scheduling and changes the scheduling mechanism.

NB-IoT includes more changes compared to eMTC. First, NB-IoT includes a narrowband MIB as well as new system information blocks. NB-IoT also changes the schedule to repeat MIB and SIBs.

The mechanisms designed in LTE for system information delivery for narrowband UEs and extended coverage are not based on the same framework as the normal system information delivery mechanisms. This introduces additional transmission overhead (leading to lower system capacity and performance) and additional complexity for both terminal and base station implementation. Additionally, the current NR working assumption on PBCH delivery is not compatible with narrowband reception.

SUMMARY

Various methods and apparatuses are disclosed to address the shortcomings identified above. Some embodiments enable a narrowband user equipment (UE) to access the system when the system information is provided over a wider bandwidth than UE supports by acquiring the system information outside the UE receiver's range using time domain repetitions. Some embodiments include system information repeated several times in a burst, followed by an opportunity for the network to enter the sleep mode.

Some embodiments generally include a wireless terminal operating in a wireless network. The terminal receives a master information block (MIB) encoded in a number of transmission blocks that are transmitted simultaneously. The terminal combines the received transmission blocks either immediately (wideband UE) or over number of transmissions (narrowband UE).

According to some embodiments, a method for use in a UE of acquiring system information or a synchronization signal comprises receiving, from a network node, a plurality of subframes. Each subframe of the plurality of subframes includes a repetition of either system information or a synchronization signal. The repetition of the system information or synchronization signal is divided into a number (N) of transmission blocks in a frequency domain of a first bandwidth (N>1). The method further comprises combining N transmission blocks from one or more repetitions of the respective received plurality of subframes to decode the system information or synchronization signal.

In particular embodiments, the UE comprises a wideband wireless device operable to receive a bandwidth equal to or greater than the first bandwidth. Combining N transmission blocks to decode the system information or synchronization signal comprises combining the N transmission blocks of one repetition of one respective subframe of the plurality of subframes.

In particular embodiments, the UE comprises a narrowband wireless device operable to receive a bandwidth less than the first bandwidth. Combining N transmission blocks to decode the system information or synchronization signal comprises combining at least one transmission block from two or more repetitions of two or more respective subframes of the plurality of subframes.

For example, each repetition of the system information or synchronization signal may include the N transmission blocks in the same position within the frequency domain, and combining at least one transmission block from two or more repetitions of two or more respective subframes of the plurality of subframes comprises frequency hopping in the plurality of subframes until the UE receives all N transmission blocks in the frequency domain. Some embodiments include frequency hopping over N subframes in the plurality of subframes and combining one transport block from each of the N subframes.

As another example, repetitions of the system information or synchronization signal include the N transmission blocks in a different order within the frequency domain. Combining at least one transmission block from two or more repetitions of two or more respective subframes of the plurality of subframes comprises combining transmission blocks at a same frequency for each subframe of the plurality of subframes until the UE receives all N of the transmission blocks in the frequency domain. For example, combining at least one transmission block from two or more repetitions of two or more respective subframes of the plurality of subframes comprises combining one transmission block at the same frequency in each of N subframes of the plurality of subframes.

In particular embodiments, the plurality of subframes comprises consecutive subframes. The system information may include at least one of a master information block (MIB) and a system information block (SIB). The synchronization signal includes at least one of a primary synchronization signal (PSS) and a secondary synchronization signal (SSS).

According to some embodiments, a UE is capable of acquiring system information or a synchronization signal. The UE comprises processing circuitry operable to receive, from a network node, a plurality of subframes. Each subframe of the plurality of subframes includes a repetition of either system information or a synchronization signal. The repetition of the system information or synchronization signal is divided into a number (N) of transmission blocks in a frequency domain of a first bandwidth (N>1). The processing circuitry is further operable to combine N transmission blocks from one or more repetitions of the respective received plurality of subframes to decode the system information or synchronization signal.

In particular embodiments, the UE comprises a wideband wireless device operable to receive a bandwidth equal to or greater than the first bandwidth. The processing circuitry is operable to combine N transmission blocks to decode the system information or synchronization signal by combining the N transmission blocks of one repetition of one respective subframe of the plurality of subframes.

In particular embodiments, the UE comprises a narrowband wireless device operable to receive a bandwidth less than the first bandwidth. The processing circuitry is operable to combine N transmission blocks to decode the system information or synchronization signal by combining at least one transmission block from two or more repetitions of two or more respective subframes of the plurality of subframes.

For example, each repetition of the system information or synchronization signal includes the N transmission blocks in the same position within the frequency domain. The processing circuitry is operable to combine at least one transmission block from two or more repetitions of two or more respective subframes of the plurality of subframes by frequency hopping in the plurality of subframes until the UE receives all N transmission blocks in the frequency domain.

In some embodiments, the UE combines the transmission blocks by frequency hopping over N subframes in the plurality of subframes and combining one transport block from each of the N subframes.

As another example, repetitions of the system information or synchronization signal include the N transmission blocks in a different order within the frequency domain. The processing circuitry is operable to combine at least one transmission block from two or more repetitions of two or more respective subframes of the plurality of subframes by combining transmission blocks at a same frequency for each subframe of the plurality of subframes until the UE receives all N of the transmission blocks in the frequency domain. In some embodiments the processing circuitry is operable to combine one transmission block at the same frequency in each of N subframes of the plurality of subframes. Additional details are described with respect to FIGS. 2-6.

In particular embodiments, the plurality of subframes comprises consecutive subframes. The system information may include at least one of a MIB and a SIB. The synchronization signal may include at least one of a PSS and a SSS.

According to some embodiments, a method for use in a network node of transmitting system information or synchronization signals comprises: dividing system information or a synchronization signal into a number (N) of transmission blocks in a frequency domain; and transmitting a plurality of subframes to a UE. Each subframe of the plurality of subframes includes a repetition of the N transmission blocks in the frequency domain.

In particular embodiments, each repetition of the system information or synchronization signal includes the N transmission blocks in the same order within the frequency domain. In some embodiments, each repetition of the system information or synchronization signal includes the N transmission blocks in a different order within the frequency domain.

In particular embodiments, each transmission block of the N transmission blocks in the frequency domain for one repetition includes a different identifier. The identifier may comprise a hybrid automatic repeat request (HARQ) incremental redundancy version.

In particular embodiments, the plurality of subframes comprises consecutive subframes. The system information includes at least one of a MIB and a SIB. The synchronization signal may include at least one of a PSS and a SSS.

According to some embodiments, a network node is capable of transmitting system information or synchronization signals. The network node comprises processing circuitry operable to: divide system information or a synchronization signal into a number (N) of transmission blocks in a frequency domain; and transmit a plurality of subframes to a user equipment (UE). Each subframe of the plurality of subframes including a repetition of the N transmission blocks in the frequency domain.

In particular embodiments, each repetition of the system information or synchronization signal includes the N transmission blocks in the same order within the frequency domain. In some embodiments, each repetition of the system information or synchronization signal includes the N transmission blocks in a different order within the frequency domain.

In particular embodiments, each transmission block of the N transmission blocks in the frequency domain for one repetition includes a different identifier. The identifier may comprise a HARQ incremental redundancy version.

In particular embodiments, the plurality of subframes comprises consecutive subframes. The system information includes at least one of a MIB and a SIB. The synchronization signal may include at least one of a PSS and a SSS.

According to some embodiments, a UE is capable of acquiring system information or a synchronization signal. The UE comprises a receiving module and a combining module. The receiving module is operable to receive, from a network node, a plurality of subframes. Each subframe of the plurality of subframes includes a repetition of either system information or a synchronization signal. The repetition of the system information or synchronization signal is divided into a number (N) of transmission blocks in a frequency domain of a first bandwidth, wherein N is an integer greater than one. The combining module is operable to combine N transmission blocks from one or more repetitions of the respective received plurality of subframes to decode the system information or synchronization signal.

According to some embodiments, a network node is capable of transmitting system information or synchronization signals. The network node comprises a dividing module and a transmitting module. The dividing module is operable to divide system information or a synchronization signal into a number (N) of transmission blocks in a frequency domain. The transmitting module is operable to transmit a plurality of subframes to a UE. Each subframe of the plurality of subframes includes a repetition of the N transmission blocks in the frequency domain.

Also disclosed is a computer program product. The computer program product comprises instructions stored on non-transient computer-readable media which, when executed by a processor, perform the act of receiving, from a network node, a plurality of subframes. Each subframe of the plurality of subframes includes a repetition of either system information or a synchronization signal. The repetition of the system information or synchronization signal is divided into a number (N) of transmission blocks in a frequency domain of a first bandwidth (N>1). The instructions further perform the act of combining N transmission blocks from one or more repetitions of the respective received plurality of subframes to decode the system information or synchronization signal.

Also disclosed is another computer program product. The computer program product comprises instructions stored on non-transient computer-readable media which, when executed by a processor, perform the acts of: dividing system information or a synchronization signal into a number (N) of transmission blocks in a frequency domain; and transmitting a plurality of subframes to a UE. Each subframe of the plurality of subframes including a repetition of the N transmission blocks in the frequency domain.

Certain embodiments may provide one or more technical advantages. For example, some embodiments may facilitate efficient support for narrowband UEs and operation in an extended coverage mode in NR. In particular embodiments, the same framework may be shared between normal system information delivery mechanisms (e.g., wideband) and system information delivery for narrowband UEs and extended coverage mode. Furthermore, particular embodiments may reduce transmission overhead and reduce complexity for both terminal and base station implementations. Other advantages may be readily available to one having skill in the art. Certain embodiments may have none, some, or all of the recited advantages.

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

Figure 1:
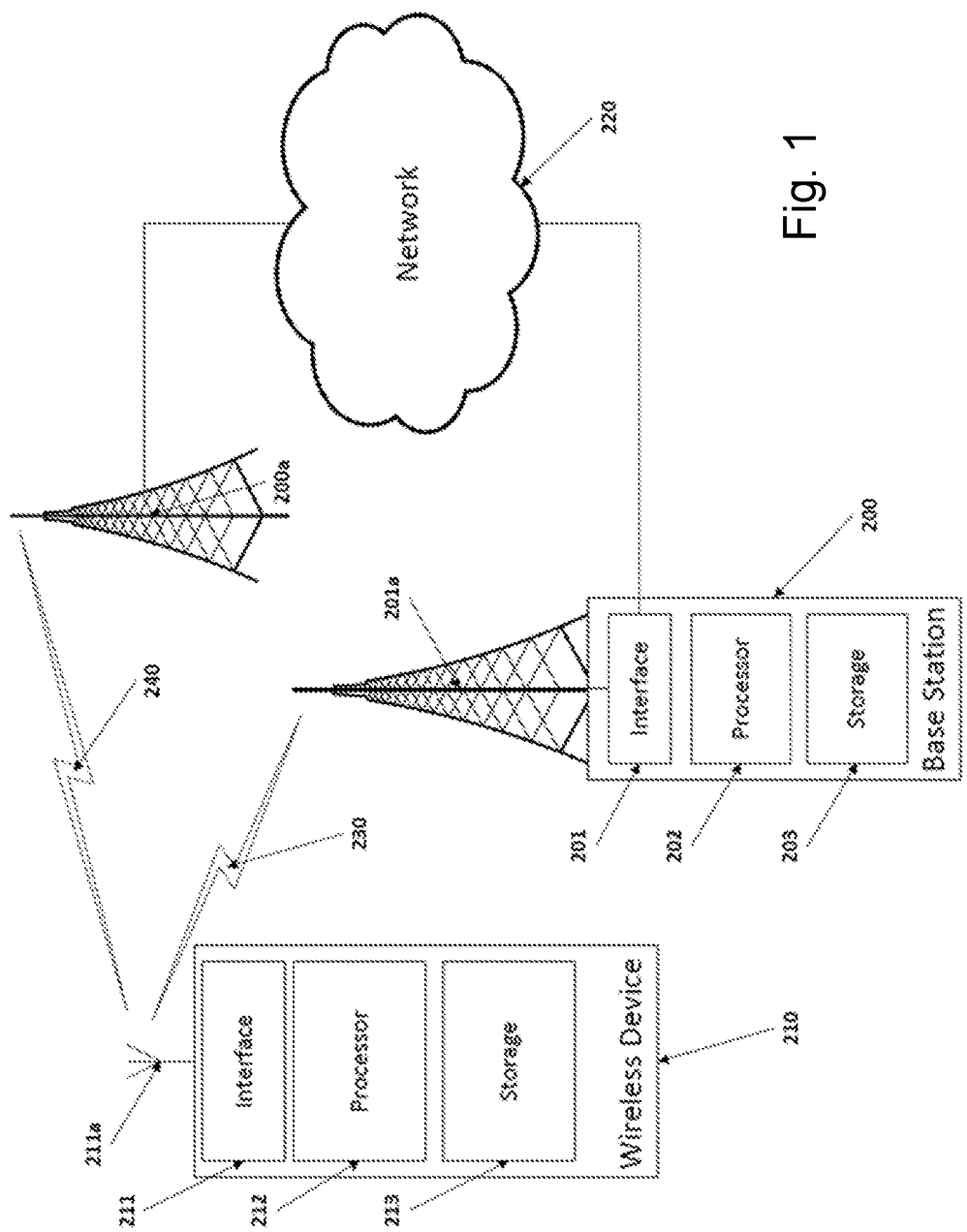
FIG. 1 is a block diagram illustrating an example wireless network, according to a particular embodiment.

Narrowband Internet of Things (NB-IoT) is a narrowband system developed for cellular Internet of Things (IoT) by the Third Generation Partnership Project (3GPP). The system is based on existing long term evolution (LTE) systems and addresses optimized network architecture and improved indoor coverage for massive number of typically low cost, low complexity, and low throughput devices.

Operating in a narrow bandwidth may be incompatible with some conventional LTE mechanisms, such as acquisition of system information of synchronization signals when the conventional LTE mechanism uses a larger bandwidth than what is available in the narrow bandwidth system. The mechanisms for system information delivery in LTE for narrowband UEs and extended coverage are not based on the same framework as the normal system information delivery mechanisms. This introduces additional transmission overhead (leading to lower system capacity and performance) and additional complexity for both terminal and base station implementation. Additionally, the current NR working assumption on PBCH delivery is not compatible with narrowband reception.

One design for supporting narrowband UEs in NR systems with subcarrier spacing larger than 15 kHz is to use a narrowband variant of the MIB (and SIBs), similar to NB-IOT design. This, however, does not result in a single technical framework for both wideband and narrowband UEs, which is a desirable feature.

Particular embodiments obviate the problems described above and may facilitate a narrowband UE to access the system when the system information is provided over a wider bandwidth than UE supports by acquiring the system information outside the UE receiver's range using time domain repetitions. Some embodiments include system information repeated several times in a burst, followed by an opportunity for the network to enter the sleep mode.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 1-8B of the drawings, like numerals being used for like and corresponding parts of the various drawings. LTE and NR are used throughout this disclosure as an example cellular system, but the ideas presented herein may apply to other wireless communication systems as well.

FIG. 1 is a block diagram illustrating an example wireless network, according to a particular embodiment. Although the solutions described herein may be implemented in any appropriate type of system using any suitable components, particular embodiments of the described solutions may be implemented in a wireless network such as the example wireless communication network illustrated in FIG. 1. In the example embodiment of FIG. 1, the wireless communication network provides communication and other types of services to one or more wireless devices. In the illustrated embodiment, the wireless communication network includes one or more instances of network equipment that facilitate the wireless devices' access to and/or use of the services provided by the wireless communication network. The wireless communication network may further include any additional elements suitable to support communication between wireless devices or between a wireless device and another communication device, such as a landline telephone.

The wireless communication network may represent any type of communication, telecommunication, data, cellular, and/or radio network or other type of system. In particular embodiments, the wireless communication network may be configured to operate according to specific standards or other types of predefined rules or procedures. Thus, particular embodiments of the wireless communication network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards.

FIG. 1 illustrates an example wireless network comprising a detailed view of a network node 200 and a wireless device (WD) 210, in accordance with particular embodiments. For simplicity, FIG. 1 only depicts network 220, network nodes 200 and 200a, and WD 210. Network node 200 comprises processor 202, storage 203, interface 201, and antenna 201a. Similarly, WD 210 comprises processor 212, storage 213, interface 211 and antenna 211a. These components may work together in order to provide network node and/or wireless device functionality, such as acquiring system information or synchronization signals. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

Network 220 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

As used herein, "network equipment" or "network node" refers to equipment capable, configured, arranged and/or operable to communicate directly or indirectly with a wireless device and/or with other equipment in the wireless communication network that enable and/or provide wireless access to the wireless device. Examples of network equipment include, but are not limited to, access points (APs), in particular radio access points. Network equipment may represent base stations (BSs), such as radio base stations.

Particular examples of radio base stations include Node Bs, evolved Node Bs (eNBs), and gNBs. Base stations may be categorized based on the amount of coverage they provide (or, stated differently, their transmit power level) and may then also be referred to as femto base stations, pico base stations, micro base stations, or macro base stations.

"Network equipment" or "network node" also includes one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base stations may also be referred to as nodes in a distributed antenna system (DAS). As a particular non-limiting example, a base station may be a relay node or a relay donor node controlling a relay.

Yet further examples of network equipment include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network equipment may represent any suitable device (or group of devices) capable, configured, arranged, and/or operable to enable and/or provide a wireless device access to the wireless communication network or to provide some service to a wireless device that has accessed the wireless communication network.

According to the illustrated embodiment, network node 200 comprises processor 202, storage 203, interface 201, and antenna 201a. These components are depicted as single boxes located within a single larger box. In practice however, a network node may comprise multiple different physical components that make up a single illustrated component (e.g., interface 201 may comprise terminals for coupling wires for a wired connection and a radio transceiver for a wireless connection).

As another example, network node 200 may be a virtual network node in which multiple different physically separate components interact to provide the functionality of network node 200 (e.g., processor 202 may comprise three separate processors located in three separate enclosures, where each processor is responsible for a different function for a particular instance of network node 200). Similarly, network node 200 may be composed of multiple physically separate components (e.g., a NodeB component and a RNC component, a BTS component and a BSC component, etc.), which may each have their own respective processor, storage, and interface components.

In certain scenarios in which network node 200 comprises multiple separate components (e.g., BTS and BSC components), one or more of the separate components may be shared among several network nodes. For example, a single RNC may control multiple NodeB's. In such a scenario, each unique NodeB and BSC pair may be a separate network node. In some embodiments, network node 200 may be configured to support multiple RATs. In such embodiments, some components may be duplicated (e.g., separate storage 203 for the different RATs) and some components may be reused (e.g., the same antenna 201a may be shared by the RATs).

Processor 202 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 200 components, such as storage 203, network node 200 functionality. For example, processor 202 may execute instructions stored in storage 203. Such functionality may include providing various wireless features discussed herein to wireless devices, such as WD 210, including any of the steps or methods disclosed herein.

Storage 203 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 203 may store any suitable instructions, data or information, including software and encoded logic, utilized by network node 200. In some embodiments, storage 203 may store one or more reference, observed or relative modulation scores and information related to the various wireless connections and cells associated with network node 200 and/or 200a. The modulation scores may be maintained in a list, database, or other organization of data useful for identifying target cells to which to change the WDs wirelessly connected to network node 200 and/or WDs wirelessly connected to other network nodes, such as network node 200a.

Network node 200 also comprises interface 201 which may be used in the wired or wireless communication of signaling and/or data between network node 200, network 220, and/or WD 210. For example, interface 201 may perform any formatting, coding, or translating that may be needed to allow network node 200 to send and receive data from network 220 over a wired connection. Interface 201 may also include a radio transmitter and/or receiver that may be coupled to or a part of antenna 201a. The radio may receive digital data that is to be sent out to other network nodes or WDs via a wireless connection. The radio may convert the digital data into a radio signal having the appropriate channel and bandwidth parameters. The radio signal may then be transmitted via antenna 201a to the appropriate recipient (e.g., WD 210).

In some embodiments, network node 200 is capable of transmitting system information (SI) (e.g., MIB, SIB, etc.) or synchronization signals (PSS, SSS, etc.). Network node 200 may divide system information or a synchronization signal into a number (N) of transmission blocks in a frequency domain. Network node 200 may transmit a plurality of subframes to WD 210. Each subframe of the plurality of subframes includes a repetition of the N transmission blocks in the frequency domain.

In particular embodiments, each repetition of the system information or synchronization signal includes the N transmission blocks in the same order within the frequency domain. In some embodiments, each repetition of the system information or synchronization signal includes the N transmission blocks in a different order within the frequency domain.

In particular embodiments, each transmission block of the N transmission blocks in the frequency domain for one repetition includes a different identifier. The identifier may comprise a HARQ incremental redundancy version.

In particular embodiments, the plurality of subframes comprises consecutive subframes. Additional details are described below with respect to FIGS. 2-6.

Antenna 201a may be any type of antenna capable of transmitting and receiving data and/or signals wirelessly. In some embodiments, antenna 201a may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

As used herein, "wireless device" refers to a device capable, configured, arranged and/or operable to communicate wirelessly with network equipment and/or another wireless device. Communicating wirelessly may involve transmitting and/or receiving wireless signals using electromagnetic signals, radio waves, infrared signals, and/or other types of signals suitable for conveying information through air. In particular embodiments, wireless devices may be configured to transmit and/or receive information without direct human interaction. For instance, a wireless device may be designed to transmit information to a network on a predetermined schedule, when triggered by an internal or external event, or in response to requests from the network. Generally, a wireless device may represent any device capable of, configured for, arranged for, and/or operable for wireless communication, for example radio communication devices. Examples of wireless devices include, but are not limited to, user equipment (UE) such as smart phones. Further examples include wireless cameras, wireless-enabled tablet computers, laptop-embedded equipment (LEE), laptop-mounted equipment (LME), USB dongles, and/or wireless customer-premises equipment (CPE).

As one specific example, a wireless device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. Instead, a UE may represent a device that is intended for sale to, or operation by, a human user but that may not initially be associated with a specific human user. The wireless device may support device-to-device (D2D) communication, for example by implementing a 3GPP standard for sidelink communication, and may in this case be referred to as a D2D communication device.

As yet another specific example, in an Internet of Things (IoT) scenario, a wireless device may represent a machine or other device that performs monitoring and/or measurements, and transmits the results of such monitoring and/or measurements to another wireless device and/or a network equipment. The wireless device may in this case be a machine-to-machine (M2M) device, which may in a 3GPP context be referred to as a machine-type communication (MTC) device. As one particular example, the wireless device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches, etc. In other scenarios, a wireless device may represent a vehicle or other equipment that is capable of monitoring and/or reporting on its operational status or other functions associated with its operation.

A wireless device as described above may represent the endpoint of a wireless connection, in which case the device may be referred to as a wireless terminal. Furthermore, a wireless device as described above may be mobile, in which case it may also be referred to as a mobile device or a mobile terminal.

According to the illustrated embodiment, WD 210 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, such as network node 200. WD 210 comprises processor 212, storage 213, interface 211, and antenna 211*a*. Like network node 200, the components of WD 210 are depicted as single boxes located within a single larger box, however, in practice a wireless device may comprise multiple different physical components that make up a single illustrated component (e.g., storage 213 may comprise multiple discrete microchips, each microchip representing a portion of the total storage capacity).

Processor 212 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other WD 210 components, such as storage 213, WD 210 functionality. Such functionality may include providing various wireless features discussed herein, including any of the steps or methods disclosed herein.

Storage 213 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 213 may store any suitable data, instructions, or information, including software and encoded logic, utilized by WD 210. In some embodiments storage 213 may maintain a list, database, or other organization of data (e.g., such as PRB weights) useful for assigning UEs, such as WD 210, to a paging PRB.

Interface 211 may be used in the wireless communication of signaling and/or data between WD 210 and network node 200. For example, interface 211 may perform any formatting, coding, or translating that may be needed to allow WD 210 to send and receive data from network node 200 over a wireless connection. Interface 211 may also include a radio transmitter and/or receiver that may be coupled to or a part of antenna 211*a*. The radio may receive digital data that is to be sent out to network node 201 via a wireless connection. The radio may convert the digital data into a radio signal having the appropriate channel and bandwidth parameters. The radio signal may then be transmitted via antenna 211*a* to network node 200.

Antenna 211*a* may be any type of antenna capable of transmitting and receiving data and/or signals wirelessly. In some embodiments, antenna 211*a* may comprise one or more omni-directional, sector or panel antennas operable to transmit/receive radio signals between 2 GHz and 66 GHz. For simplicity, antenna 211*a* may be considered a part of interface 211 to the extent that a wireless signal is being used.

In particular embodiments, WD 210 is capable of acquiring system information or a synchronization signal. WD 210 may receive, from a network node, a plurality of subframes. Each subframe of the plurality of subframes may include a repetition of either system information and/or a synchronization signal. The repetition of the system information or synchronization signal is divided into a number (N) of transmission blocks in a frequency domain of a first bandwidth (N>1). WD 210 may combine N transmission blocks from one or more repetitions of the respective received plurality of subframes to decode the system information or synchronization signal. WD 210 may combine transmission blocks in the frequency domain, time domain, or a combination of frequency and time domain.

In particular embodiments, WD 210 comprises a wideband wireless device operable to receive a bandwidth equal to or greater than the first bandwidth. WD 210 combines N transmission blocks to decode the system information or synchronization signal by combining the N transmission blocks of one repetition of one respective subframe of the plurality of subframes (i.e., frequency domain combining).

In particular embodiments, WD 210 comprises a narrowband wireless device operable to receive a bandwidth less than the first bandwidth (i.e., the narrowband bandwidth is less than the bandwidth used to transmit the system information or synchronization signal). WD 210 is operable to combine N transmission blocks to decode the system information or synchronization signal by combining at least one transmission block from two or more repetitions of two or more respective subframes of the plurality of subframes (i.e., combining in frequency and/or time domains).

For example, in some embodiments each repetition of the system information or synchronization signal may include the N transmission blocks in the same position within the frequency domain. WD 210 combines at least one transmission block from two or more repetitions of two or more respective subframes of the plurality of subframes by frequency hopping in the plurality of subframes until the UE receives all N transmission blocks in the frequency domain (i.e., combining in frequency and time domain). In some embodiments, WD 210 combines the transmission blocks by frequency hopping over N subframes in the plurality of subframes and combining one transport block from each of the N subframes.

As another example, in some embodiments repetitions of the system information or synchronization signal may include the N transmission blocks in a different order within the frequency domain. WD 210 combines at least one transmission block from two or more repetitions of two or more respective subframes of the plurality of subframes by combining transmission blocks at a same frequency for each subframe of the plurality of subframes until the UE receives all N of the transmission blocks in the frequency domain (i.e., combining in time domain). In some embodiments the processing circuitry is operable to combine one transmission block at the same frequency in each of N subframes of the plurality of subframes. In particular embodiments, the plurality of subframes comprises consecutive subframes.

Although the wireless device and network node described in the example wireless communication network of FIG. 1 may represent devices and nodes that include any suitable combination of hardware and/or software, the devices and nodes may, in particular embodiments, represent particular devices and nodes. Some example implementations of wireless devices, network equipment, and radio nodes illustrated above are described below with respect to FIGS. 7A-8B.

Figure 2:
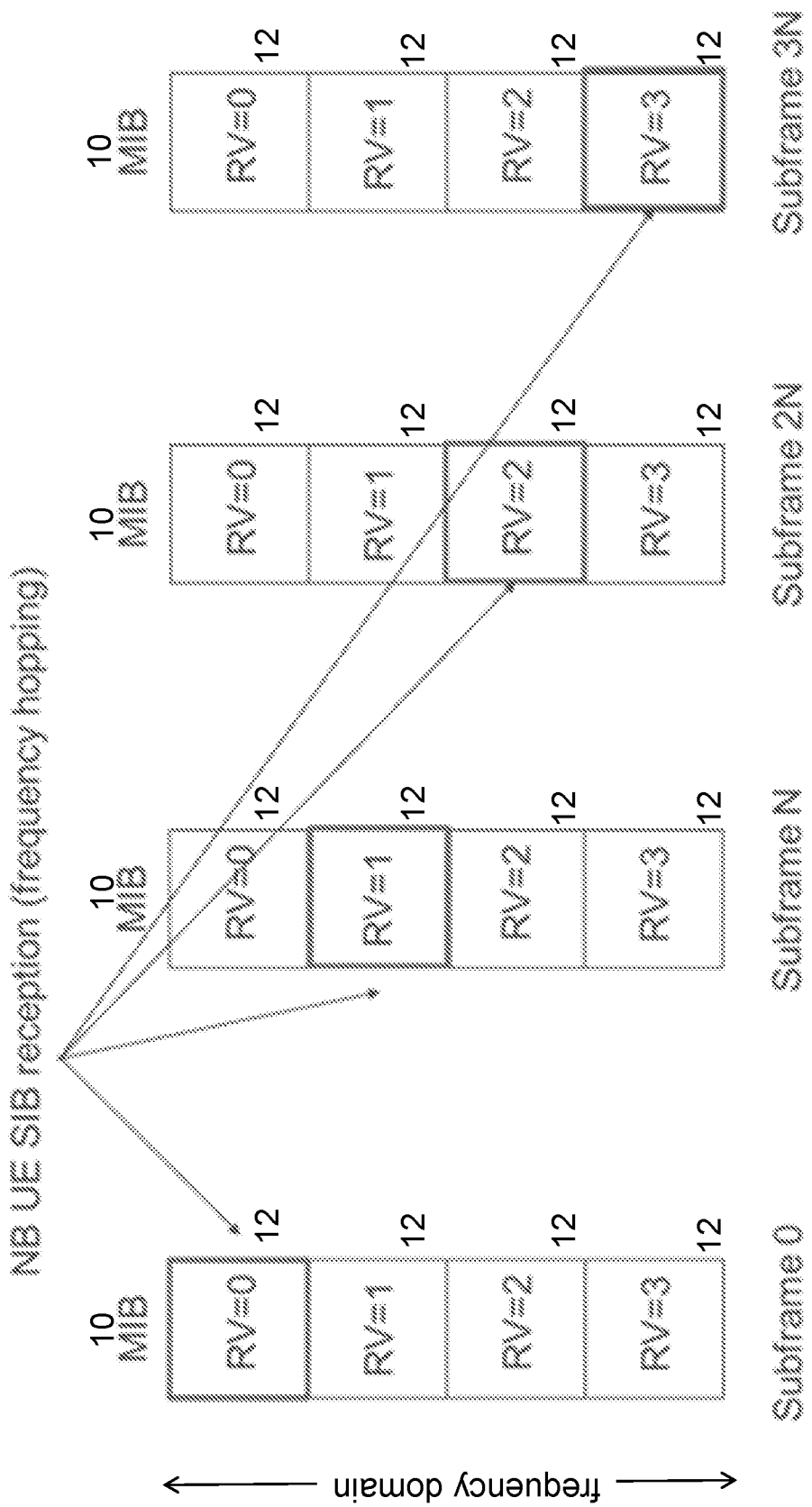
FIG. 2 illustrates a block diagram of several repetitions of system information and frequency hopping, according to some embodiments.

Particular embodiments facilitate a narrowband UE to access the network when the system information is provided over a wider bandwidth. The UE may acquire the system information outside the receiver's range using time domain repetitions. FIGS. 1 and 2 illustrate two examples. System information (i.e., MIB) is used in both examples, but a similar approach may be used for all system information not delivered with dedicated signaling or for synchronization channels (e.g., PSS/SSS). In both examples, the MIB is split to a number of transport or code blocks, each coded with a different incremental redundancy version (RV).

A UE with a wideband receiver can receive all blocks in a single subframe, and immediately decode the MIB. A narrowband UE, however, can either perform frequency hopping to receive all blocks over a number of transmission occasions (e.g., FIG. 1), or the network can alternate the order of the redundancy versions (e.g., FIG. 2). In both cases, the UE is able to decode the MIB after collecting required blocks from multiple transmission occasions.

FIG. 2 illustrates a block diagram of several repetitions of system information and frequency hopping, according to some embodiments. The vertical axis represents the frequency domain and the horizontal axis represents the time domain. FIG. 2 illustrates four example subframes (i.e., Subframe 0-Subframe 3N). Each subframe includes system information, such as MIB 10. MIB 10 is repeated in each subframe 0-3N. Each instance of MIB 10 may be referred to as a repetition.

The data of MIB 10 is divided among multiple transport blocks 12. In the illustrated example, each MIB 10 is divided among 4 transport blocks 12.

Each transport block 12 may be associated with an identifier. For example, in some embodiments each transport block 12 may be associated with a HARQ redundancy version (RV). In the illustrated embodiments, the four transport blocks 12 of each repetition of MIB 10 are assigned RV 0-3. To acquire MIB 10, a wireless device, such as wireless device 210, combines all four transport blocks 12 (i.e., transport blocks RV 0, 1, 2, and 3).

Network node 200 may transmit MIB 10 using a particular frequency bandwidth. A wideband wireless device 210 may be able to receive a bandwidth equal to or larger than the particular frequency bandwidth used for transmitting MIB 10. Wideband wireless device 210 may acquire MIB 10 in a single subframe, because wideband wireless device 210 may receive all four transport blocks 12 in a single subframe. Wideband wireless device 210 combines transport blocks in the time domain to acquire MIB 10. Wideband wireless device 210 may acquire MIB 10 in any one or more of subframes 0-3N.

A narrowband wireless device 210 may only be able to receive a bandwidth less than the particular frequency bandwidth used for transmitting MIB 10. In particular embodiments, narrowband wireless device 210 may combine transport blocks in the frequency and time domain to acquire MIB 10.

For example, narrowband wireless device 210 may be able to receive a bandwidth equal to the bandwidth of one transport block 12. To acquire MIB 10, narrowband wireless device 210 combines transport blocks 12 in the time domain (e.g., one transport block per subframe). In the illustrated example, network node 200 transmits the transport blocks of each subframe in the same order (i.e., RV 0 at the higher frequency down to RV 3 at the lower frequency for each subframe 0-3N). Accordingly, narrowband wireless device 210 may use frequency hopping to receive each transport block RV 0-3.

For example, narrowband wireless device 210 may receive transport block RV 0 at subframe 0, hop to the frequency of transport block RV 1 at subframe N, hop to the frequency of transport block RV 2 at subframe 2N, and hop to the frequency of transport block RV 3 at subframe 3N. After receiving all four transport blocks 12 (i.e., RV 0-3), narrowband wireless device 210 may combine the four transport blocks (i.e., RV 0-3) to acquire MIB 10. Although the frequency hopping is illustrated in a particular order, particular embodiments may use any suitable order over any suitable number of transport blocks and subframes.

In other embodiments, the receiver bandwidth of narrowband wireless device 210 may be larger than the bandwidth of a single transport block. For example, narrowband wireless device 210 may receive two or more transport blocks in each subframe.

Using frequency hopping over multiple subframes, the narrowband wireless device may obtain the system information or synchronization signals by combining transport blocks in both the frequency and time domain. In other embodiments, the narrowband wireless device may obtain the system information or synchronization signals by combining transport blocks in just the time domain. An example is illustrated in FIG. 3.

Figure 3:
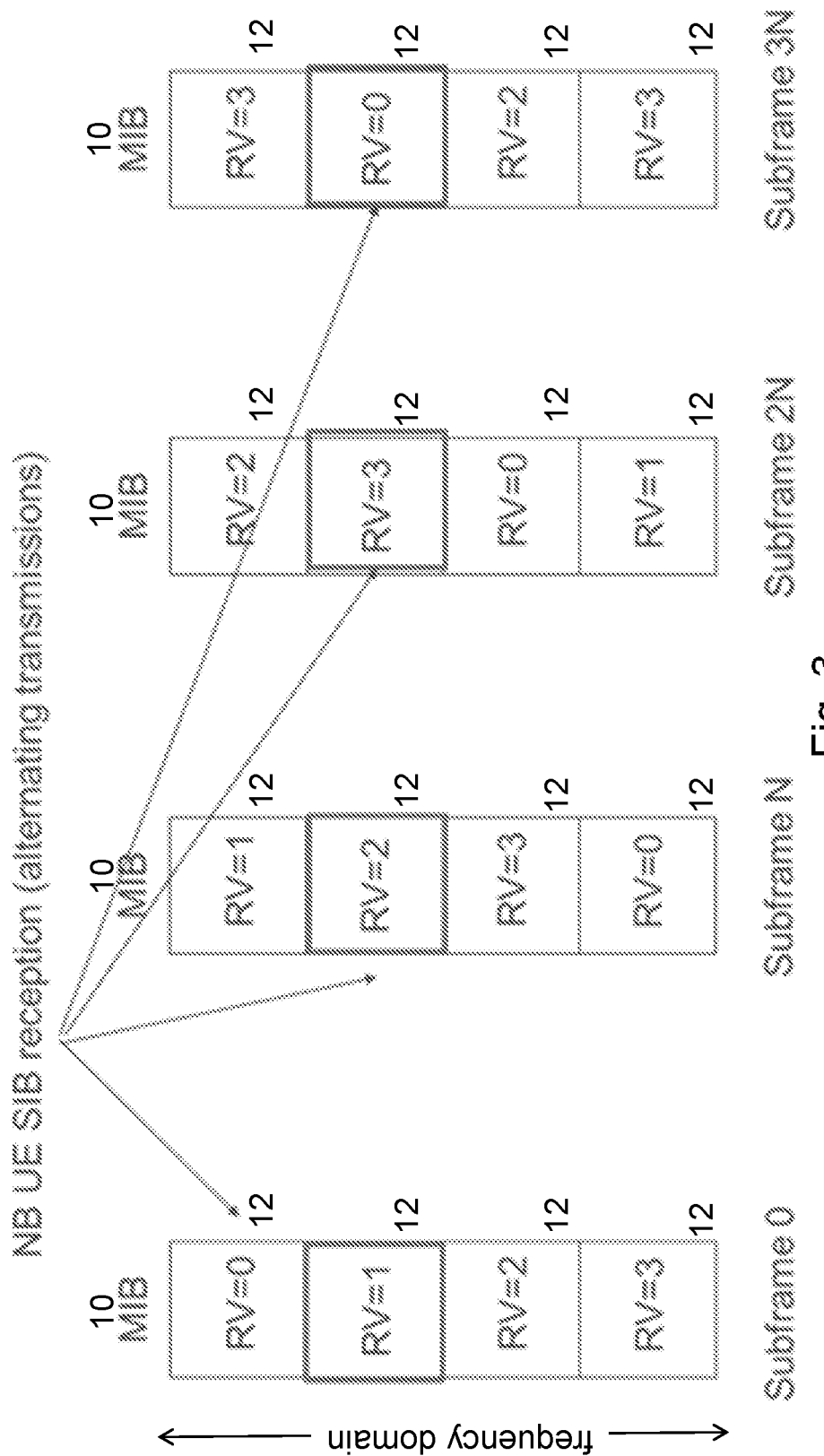
FIG. 3 illustrates a block diagram of several repetitions of system information with alternating frequency transmission, according to some embodiments.

FIG. 3 illustrates a block diagram of several repetitions of system information with alternating frequency transmission, according to some embodiments. FIG. 3 illustrates subframes and transport blocks in the frequency and time domains similar to FIG. 2. A difference is that the order of transport blocks 12 in the frequency domain varies in each subframe.

For example, in subframe 0 transport blocks 12 are ordered RV 0, 1, 2, 3 from the higher frequency to the lower frequency. In subframe N, transport blocks 12 are ordered RV 1, 2, 3, 0. In subframe 2N, transport blocks 12 are ordered RV 2, 3, 0, 1, and so on for the remaining subframes.

A wideband wireless device 210 may be able to receive all four transport blocks 12 in a single subframe. Wideband wireless device 210 combines transport blocks RV 0-3 in the proper order to acquire MIB 10. Wideband wireless device 210 may acquire MIB 10 in any one or more of subframes 0-3N.

A narrowband wireless device 210 may only be able to receive a bandwidth less than the particular frequency bandwidth used for transmitting MIB 10. In particular embodiments, narrowband wireless device 210 may combine transport blocks in the time domain to acquire MIB 10.

For example, narrowband wireless device 210 may be able to receive a bandwidth equal to the bandwidth of one transport block 12. To acquire MIB 10, narrowband wireless device 210 combines transport blocks 12 in the time domain (e.g., one transport block per subframe). In the illustrated example, network node 200 transmits the transport blocks of each subframe in a different order (i.e., changing the frequency position of transport blocks per subframe) so that each of the four transport blocks (i.e., RV 0-3) appears at a particular frequency position at some instance in time.

Accordingly, narrowband wireless device 210 does not need to use frequency hopping to receive each transport block RV 0-3. Narrowband wireless device 210 may receive the same frequency position at each subframe until narrowband wireless device 210 has received all four transport blocks (i.e., RV 0-3). In the illustrated example, narrowband wireless device 210 receives, at a particular frequency, RV 1 at subframe 0, RV 2 at subframe N, RV 3 at subframe 2N, and RV 0 at subframe 3N.

After receiving all four transport blocks 12 (i.e., RV 0-3), narrowband wireless device 210 may combine the four transport blocks (i.e., RV 0-3) to acquire MIB 10. Although the transport blocks are changed in a particular order in the illustrated embodiment, particular embodiments may use any suitable order over any suitable number of transport blocks and subframes.

Figure 4:
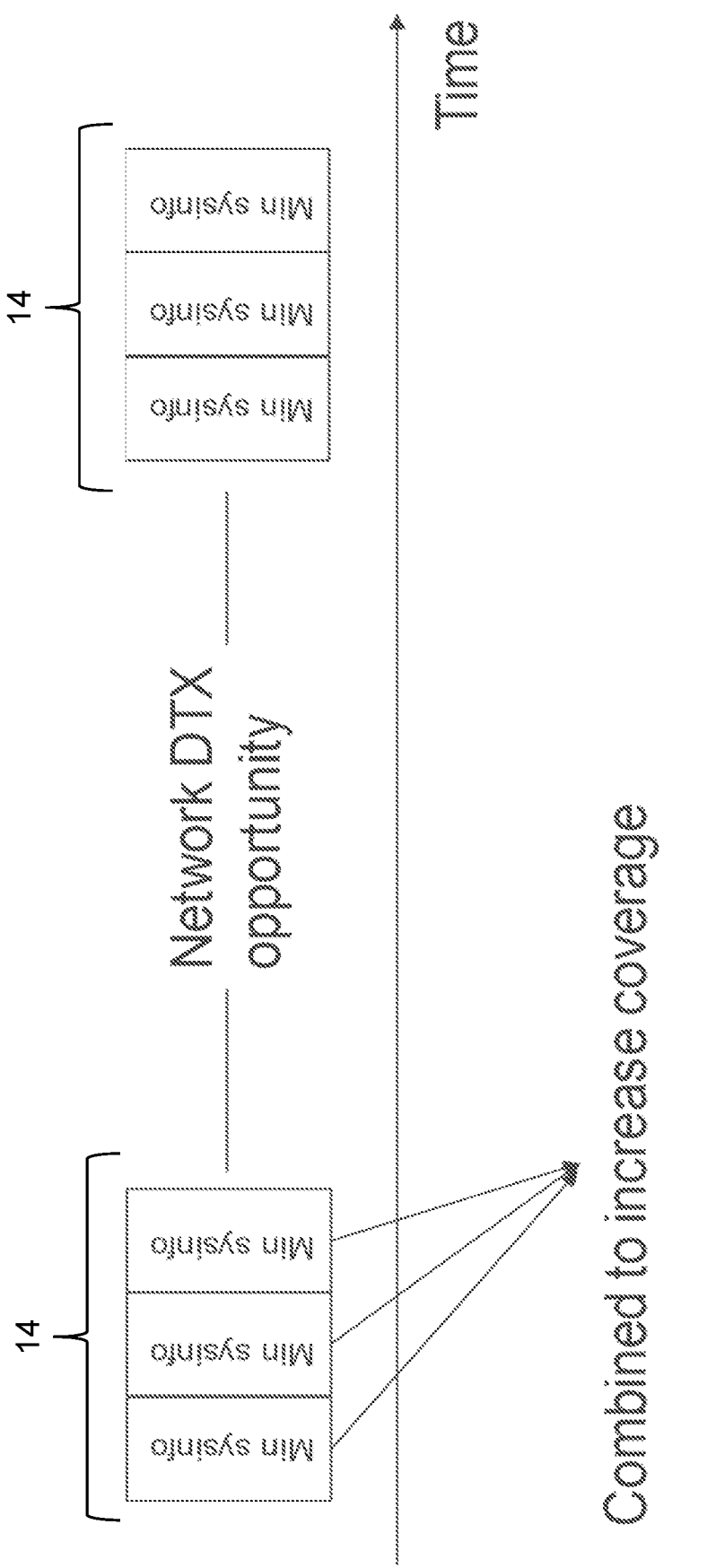
FIG. 4 illustrates a sequence diagram where system information is repeated several times in a burst, followed by an opportunity for network discontinuous transmission (DTX), according to some embodiments.

Although the illustrated embodiments in FIGS. 3 and 4 include four subframes with four transport blocks in each subframe, other embodiments may include any suitable number of subframes and transport blocks. In some embodiments, the number of subframes may be different than the number of transport blocks in each subframe.

Although the examples described herein refer to one or more subframes, other embodiments, such as NR embodiments, may replace the term subframe with transmission time interval (TTI) because the embodiments described herein may apply to any length TTI, in addition to the 1 ms LTE subframe.

A particular advantage of the illustrated embodiment is that a network node transmits system information and/or synchronization signals using one transmission structure (i.e., dividing the information among multiple smaller bandwidth transport blocks). Both a wideband wireless device and a narrowband wireless device may receive the information, which improves network efficiency and reduced device complexity.

In another group of embodiments, at least a minimum system information must be possible for a UE to acquire when the UEs are in extended coverage. Various techniques, such as soft combining of multiple transmissions of minimum system information, beamforming of minimum system information, or dedicated signaling, can be considered at least for users in worst radio conditions. A preferred mechanism, however, is to extend the coverage of the minimum system information by repeating transmissions in time.

To limit the number of correlations that a UE performs to detect the minimum system information, particular embodiments locate the repetitions at known time instances. In addition, from network energy consumption point of view, it is preferable to transmit all repetitions in one burst instead of spreading them over the time. An example is illustrated in FIG. 4.

FIG. 4 illustrates a sequence diagram where system information is repeated several times in a burst, followed by an opportunity for network discontinuous transmission (DTX), according to some embodiments. The horizontal axis represents time and the vertical axis represents frequency. A first burst of minimum system information 14 is followed by a second burst of minimum system information 14. Each burst of minimum system information 14 includes multiple repetitions of the minimum system information.

Particular embodiments include methods in a wireless device and in a network node. Example methods are illustrated in FIGS. 5 and 6.

Figure 5:
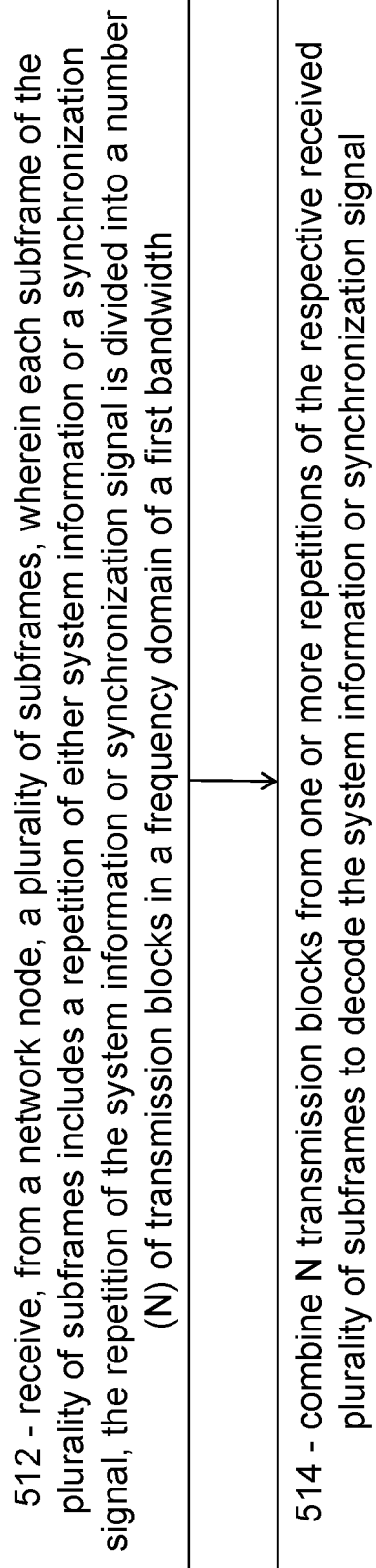
FIG. 5 is process flow diagram for an example method performed by a wireless device, according to particular embodiments.
Figure 6:
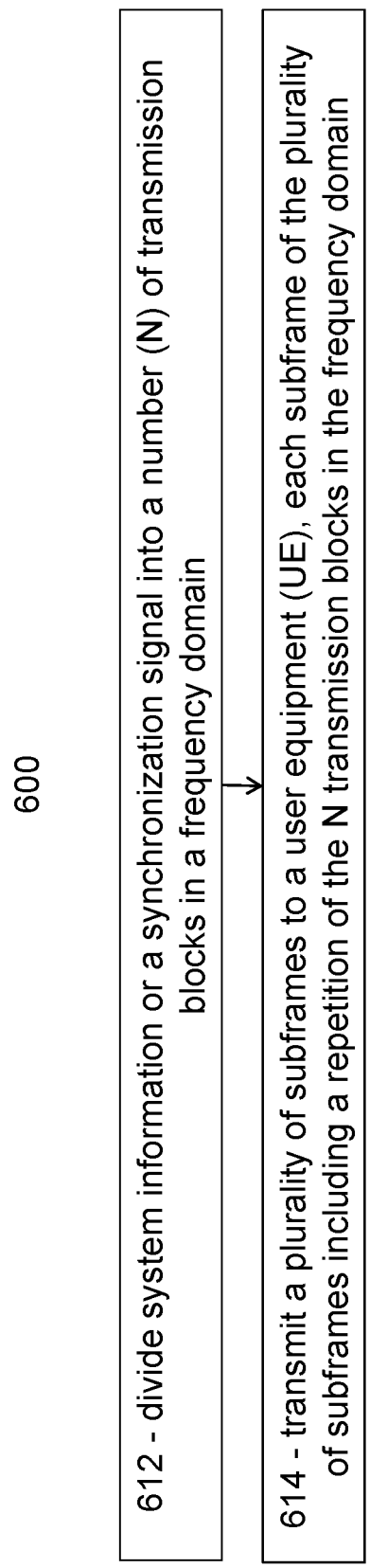
FIG. 6 is process flow diagram for an example method performed by a network node, according to particular embodiments.

FIG. 5 is process flow diagram for an example method performed by a wireless device, according to particular embodiments. Method 500 includes acquiring system information or a synchronization signal. In particular embodiments, one or more steps of method 500 may be performed by wireless device 210 of the wireless network described with reference to FIG. 1.

The method begins at step 512, where a user equipment receives, from a network node, a plurality of subframes. Each subframe of the plurality of subframes includes a repetition of either system information or a synchronization signal. The repetition of the system information or synchronization signal is divided into a number (N) of transmission blocks in a frequency domain of a first bandwidth (N>1).

For example, wireless device 210 may receive a plurality of subframes from network node 200. Referring to FIGS. 2 and 3, each subframe of the plurality of subframes includes a repetition of MIB 10. The repetition of MIB 10 is divided into 4 transmission blocks 12 in the frequency domain (i.e. RV 0-3).

In some embodiments, each repetition of the system information or synchronization signal may include the N transmission blocks in the same position within the frequency domain (e.g., FIG. 2). In some embodiments, each repetition of the system information or synchronization signal may include the N transmission blocks in a different position within the frequency domain (e.g., FIG. 3).

In particular embodiments, the plurality of subframes comprises consecutive subframes. The system information may include at least one of a MIB and a SIB. The synchronization signal includes at least one of a PSS and a SSS.

At step 514, the user equipment combines N transmission blocks from one or more repetitions of the respective received plurality of subframes to decode the system information or synchronization signal. For example, wireless device 210 may combine transmission blocks from the frequency domain, time domain, or any combination, to decode the system information or synchronization signal.

In some embodiments, wideband wireless device 210 may receive a bandwidth equal to or greater than the first bandwidth. Wideband wireless device 210 may combine the N transmission blocks of one repetition of one respective subframe of the plurality of subframes. For example, with respect to FIG. 2 or 3, wideband wireless device 210 may receive all 4 transport blocks 12 (i.e., RV 0-3) at one time in any one of the subframes 0-3N. Wideband wireless device 210 may combine the 4 transport blocks 12 to decode the system information (e.g., MIB 10). Wideband wireless device 210 combines transport blocks 12 in the time domain.

In some embodiments, narrowband wireless device 210 may receive a bandwidth less than the first bandwidth. Narrowband wireless device 210 may combine at least one transmission block from two or more repetitions of two or more respective subframes of the plurality of subframes. For example, with respect to FIG. 2 or 3, narrowband wireless device 210 may combine one transmission block 12 from each of subframes 0-3N to decode the system information.

In particular embodiments, narrowband wireless device 210 combines transport blocks 12 in both the time and frequency domains (e.g., FIG. 2). For example, when each repetition of the system information or synchronization signal may include the N transmission blocks in the same position within the frequency domain, then narrowband wireless device 210 may perform frequency hopping in the plurality of subframes until the UE receives all N transmission blocks in the frequency domain. Some embodiments include frequency hopping over N subframes in the plurality of subframes and combining one transport block from each of the N subframes, as described above with respect to FIG. 2.

In particular embodiments, narrowband wireless device 210 combines transport blocks 12 in both the time domain (e.g., FIG. 3). For example, when each repetition of the system information or synchronization signal may include the N transmission blocks in different positions within the frequency domain, then narrowband wireless device 210 may combine transport blocks 12 at the same frequency for each subframe until the UE receives all N transmission blocks in the frequency domain. Some embodiments combine one transmission block at the same frequency in each of N subframes of the plurality of subframes, as described above with respect to FIG. 3.

Modifications, additions, or omissions may be made to method 500 illustrated in FIG. 5. Additionally, one or more steps in method 500 may be performed in parallel or in any suitable order.

FIG. 6 is process flow diagram for an example method performed by a network node, according to particular embodiments. Method 600 includes transmitting system information or synchronization signals. In particular embodiments, one or more steps of method 600 may be performed by network node 200 of the wireless network described with reference to FIG. 1.

The method begins at step 612, where the network node divides system information or a synchronization signal into a number (N) of transmission blocks in a frequency domain. For example, network node 200 may divide system information, such as MIB 10, into N transmission blocks according to any of the examples and embodiments described herein and with respect to FIGS. 2 and 3.

In particular embodiments, each repetition of the system information or synchronization signal includes the N transmission blocks in the same order within the frequency domain. In some embodiments, each repetition of the system information or synchronization signal includes the N transmission blocks in a different order within the frequency domain.

In particular embodiments, each transmission block of the N transmission blocks in the frequency domain for one repetition includes a different identifier. The identifier may comprise a hybrid automatic repeat request (HARQ) incremental redundancy version.

The system information includes at least one of a MIB and a SIB. The synchronization signal may include at least one of a PSS and a SSS.

At step 614, the network node transmits a plurality of subframes to a UE. Each subframe of the plurality of subframes includes a repetition of the N transmission blocks in the frequency domain. For example, network node 200 may transmit a plurality of subframes according to any of the examples and embodiments described herein and with respect to FIGS. 2 and 3. In particular embodiments, the plurality of subframes comprises consecutive subframes.

Modifications, additions, or omissions may be made to method 600 illustrated in FIG. 6. Additionally, one or more steps in method 600 may be performed in parallel or in any suitable order.

Figure 7B:
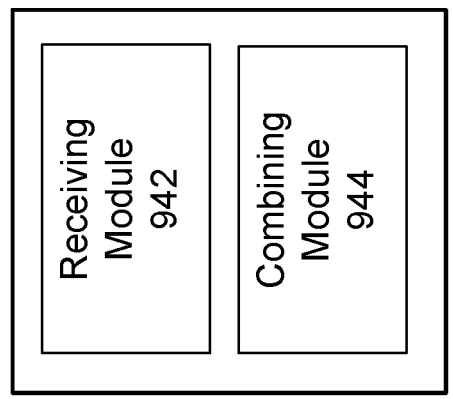
FIG. 7B is a block diagram illustrating example components of a wireless device.
Figure 7A:
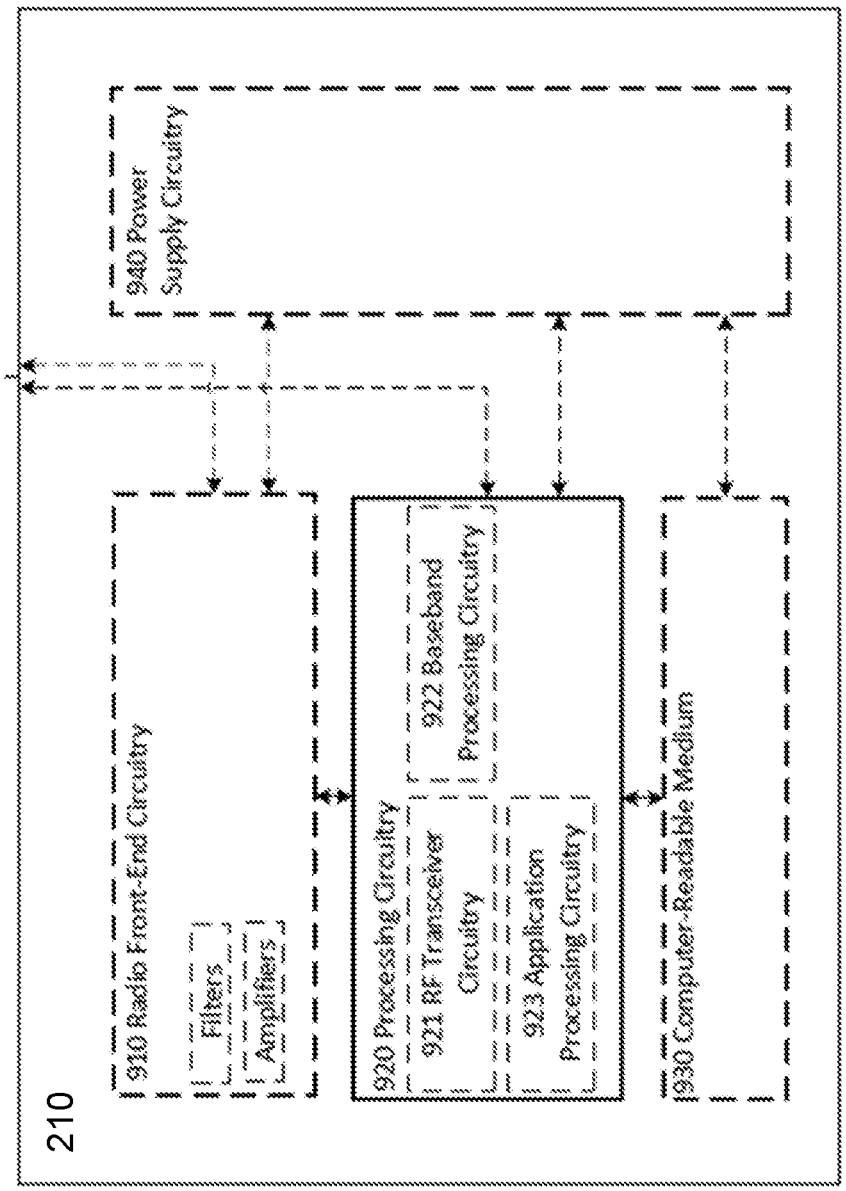
FIG. 7A is a block diagram illustrating an example embodiment of a wireless device.

FIG. 7A is a block diagram illustrating an example embodiment of a wireless device. An example wireless device 210 includes an antenna 905, radio front-end circuitry 910, processing circuitry 920, and a computer-readable storage medium 930. Antenna 905 may include one or more antennas or antenna arrays, and is configured to send and/or receive wireless signals, and is connected to radio front-end circuitry 910. In certain alternative embodiments, wireless device 210 may not include antenna 905, and antenna 905 may instead be separate from wireless device 210 and be connectable to wireless device 210 through an interface or port.

The radio front-end circuitry 910 may comprise various filters and amplifiers, is connected to antenna 905 and processing circuitry 920, and is configured to condition signals communicated between antenna 905 and processing circuitry 920. In certain alternative embodiments, wireless device 900 may not include radio front-end circuitry 910, and processing circuitry 920 may instead be connected to antenna 905 without radio front-end circuitry 910.

Processing circuitry 920 may include one or more of radio frequency (RF) transceiver circuitry 921, baseband processing circuitry 922, and application processing circuitry 923. In some embodiments, the RF transceiver circuitry 921, baseband processing circuitry 922, and application processing circuitry 923 may be on separate chipsets. In alternative embodiments, part or all of the baseband processing circuitry 922 and application processing circuitry 923 may be combined into one chipset, and the RF transceiver circuitry 921 may be on a separate chipset. In still alternative embodiments, part or all of the RF transceiver circuitry 921 and baseband processing circuitry 922 may be on the same chipset, and the application processing circuitry 923 may be on a separate chipset. In yet other alternative embodiments, part or all of the RF transceiver circuitry 921, baseband processing circuitry 922, and application processing circuitry 923 may be combined in the same chipset. Processing circuitry 920 may include, for example, one or more central processing units (CPUs), one or more microprocessors, one or more application specific integrated circuits (ASICs), and/or one or more field programmable gate arrays (FPGAs).

In particular embodiments, some or all of the functionality described herein as being provided by a wireless device may be provided by the processing circuitry 920 executing instructions stored on a computer-readable storage medium 930, as shown in FIG. 7A. In alternative embodiments, some or all of the functionality may be provided by the processing circuitry 920 without executing instructions stored on a computer-readable medium, such as in a hard-wired manner. In any of those particular embodiments, whether executing instructions stored on a computer-readable storage medium or not, the processing circuitry can be said to be configured to perform the described functionality. The benefits provided by such functionality are not limited to the processing circuitry 920 alone or to other components of the wireless device, but are enjoyed by the wireless device as a whole, and/or by end users and the wireless network generally.

Antenna 905, radio front-end circuitry 910, and/or processing circuitry 920 may be configured to perform any receiving operations described herein as being performed by a wireless device. Any information, data and/or signals may be received from a network equipment and/or another wireless device.

The processing circuitry 920 may be configured to perform any determining operations described herein as being performed by a wireless device. Determining as performed by processing circuitry 920 may include processing information obtained by the processing circuitry 920 by, for example, converting the obtained information into other information, comparing the obtained information or converted information to information stored in the wireless device, and/or performing one or more operations based on the obtained information or converted information, and as a result of said processing making a determination.

Antenna 905, radio front-end circuitry 910, and/or processing circuitry 920 may be configured to perform any transmitting operations described herein as being performed by a wireless device. Any information, data and/or signals may be transmitted to a network equipment and/or another wireless device.

Computer-readable storage medium 930 is generally operable to store instructions, such as a computer program, software, an application including one or more of logic, rules, code, tables, etc. and/or other instructions capable of being executed by a processor.

Examples of computer-readable storage medium 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processing circuitry 920. In some embodiments, processing circuitry 920 and computer-readable storage medium 930 may be considered to be integrated.

Alternative embodiments of the wireless device 210 may include additional components beyond those shown in FIG. 7A that may be responsible for providing certain aspects of the wireless device's functionality, including any of the functionality described herein and/or any functionality necessary to support the solution described above. As just one example, wireless device 210 may include input interfaces, devices and circuits, and output interfaces, devices and circuits.

Input interfaces, devices, and circuits are configured to allow input of information into wireless device 210, and are connected to processing circuitry 920 to allow processing circuitry 920 to process the input information. For example, input interfaces, devices, and circuits may include a microphone, a proximity or other sensor, keys/buttons, a touch display, one or more cameras, a USB port, or other input elements.

Output interfaces, devices, and circuits are configured to allow output of information from wireless device 210, and are connected to processing circuitry 920 to allow processing circuitry 920 to output information from wireless device 900. For example, output interfaces, devices, or circuits may include a speaker, a display, vibrating circuitry, a USB port, a headphone interface, or other output elements. Using one or more input and output interfaces, devices, and circuits, wireless device 210 may communicate with end users and/or the wireless network, and allow them to benefit from the functionality described herein.

As another example, wireless device 210 may include power supply circuitry 940. The power supply circuitry 940 may comprise power management circuitry. The power supply circuitry may receive power from a power source, which may either be comprised in, or be external to, power supply circuitry 940. For example, wireless device 210 may comprise a power source in the form of a battery or battery pack which is connected to, or integrated in, power supply circuitry 940. Other types of power sources, such as photovoltaic devices, may also be used. As a further example, wireless device 210 may be connectable to an external power source (such as an electricity outlet) via an input circuitry or interface such as an electrical cable, whereby the external power source supplies power to power supply circuitry 940.

Power supply circuitry 940 may be connected to radio front-end circuitry 910, processing circuitry 920, and/or computer-readable storage medium 930 and be configured to supply wireless device 210, including processing circuitry 920, with power for performing the functionality described herein.

Wireless device 20 may also include multiple sets of processing circuitry 920, computer-readable storage medium 930, radio circuitry 910, and/or antenna 905 for different wireless technologies integrated into wireless device 900, such as, for example, GSM, WCDMA, LTE, NR, WiFi, or Bluetooth wireless technologies. These wireless technologies may be integrated into the same or different chipsets and other components within wireless device 210.

FIG. 10B is a block diagram illustrating example components of a wireless device. The components may include receiving module 942 and combining module 944.

Receiving module 942 may perform the receiving functions of wireless device 210. For example, receiving module 942 may receive a plurality of subframes, wherein each subframe of the plurality of subframes includes a repetition of either system information or a synchronization signal, the repetition of the system information or synchronization signal is divided into a number (N) of transmission blocks in a frequency domain of a first bandwidth.

Receiving module 942 may perform the receiving functions according to any of the embodiments and examples described above (e.g., step 512 of FIG. 5). In certain embodiments, receiving module 942 may include or be included in processing circuitry 920. In particular embodiments, receiving module 942 may communicate with combining module 944.

Combining module 944 may perform the combining functions of wireless device 210. For example, combining module 944 may combine N transmission blocks from one or more repetitions of the respective received plurality of subframes to decode the system information or synchronization signal, according to any of the embodiments or examples described above (e.g., step 514 of FIG. 5). In certain embodiments, combining module 944 may include or be included in processing circuitry 920. In particular embodiments, combining module 944 may communicate with receiving module 942.

Figure 8A:
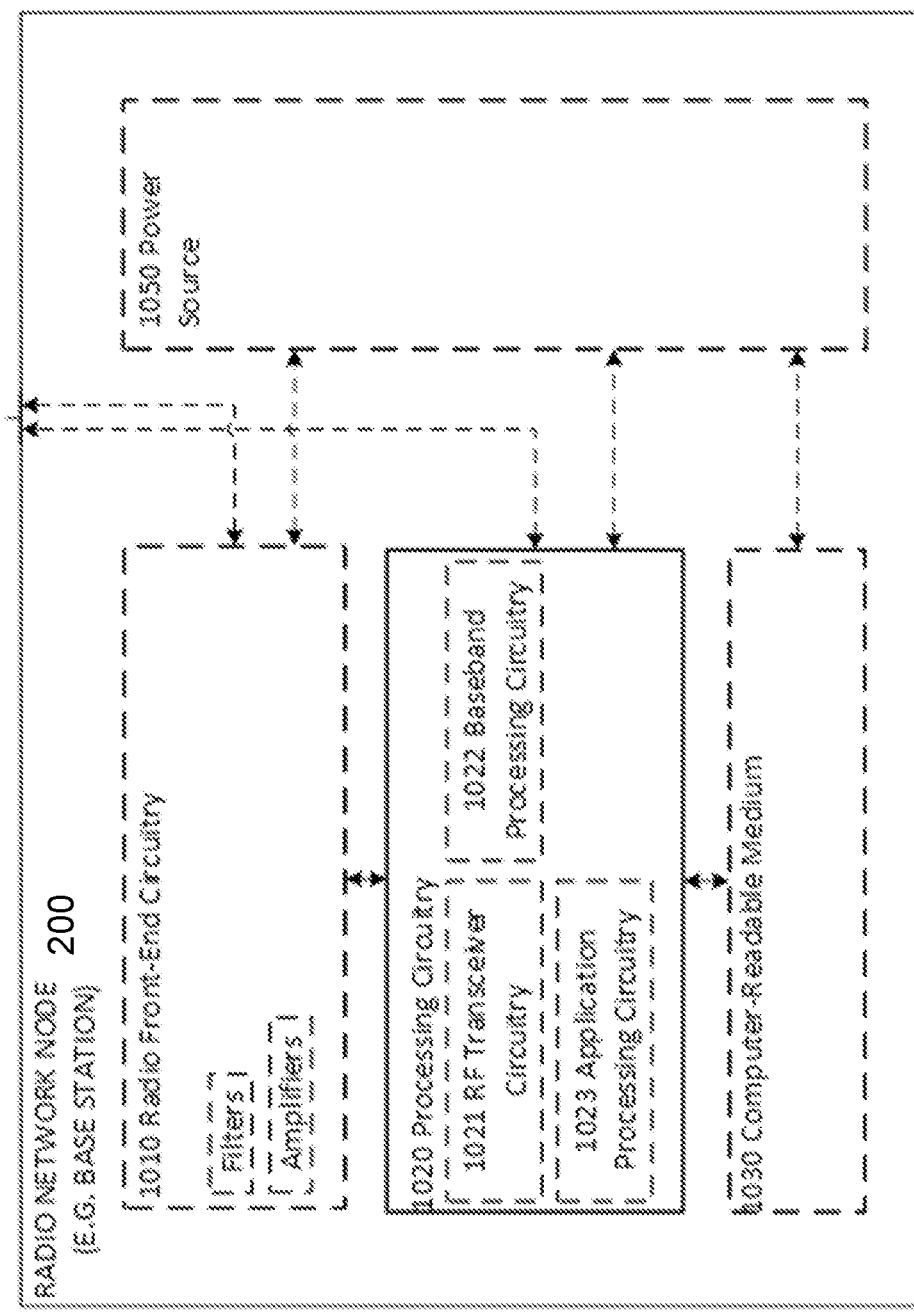
FIG. 8A is a block diagram illustrating an example embodiment of a network node.

FIG. 8A is a block diagram illustrating an example embodiment of a network node. An example radio network node 200 includes an antenna 1040, radio circuitry (e.g. radio front-end circuitry) 1010, processing circuitry 1020, and the radio network node 200 may also include a memory 1030. The memory 1030 may be separate from the processing circuitry 1020 or an integral part of processing circuitry 1020. Antenna 1040 may include one or more antennas or antenna arrays, and is configured to send and/or receive wireless signals, and is connected to radio circuitry (e.g.

radio front-end circuitry) 1010. In certain alternative embodiments, radio network node 200 may not include antenna 1040, and antenna 1040 may instead be separate from radio network node 200 and be connectable to radio network node 200 through an interface or port. The processing circuitry 1020 may be configured to divide system information or a synchronization signal into a number (N) of transmission blocks in a frequency domain, and transmit a plurality of subframes to a wireless device. Each subframe of the plurality of subframes includes a repetition of the N transmission blocks in the frequency domain.

The radio circuitry (e.g. radio front-end circuitry) 1010 may comprise various filters and amplifiers, is connected to antenna 1040 and processing circuitry 1020, and is configured to condition signals communicated between antenna 1040 and processing circuitry 1020. In certain alternative embodiments, radio network node 200 may not include radio circuitry (e.g. radio front-end circuitry) 1010, and processing circuitry 1020 may instead be connected to antenna 1040 without front-end circuitry 1010. The radio circuitry 1010 may be configured to transmit a system information and paging messages. The radio circuitry 1010 may be configured to transmit control information to a UE in accordance with the transmitted signal.

Processing circuitry 1020 may include one or more of radio frequency (RF) transceiver circuitry, baseband processing circuitry, and application processing circuitry. In some embodiments, the RF transceiver circuitry 1021, baseband processing circuitry 1022, and application processing circuitry 1023 may be on separate chipsets. In alternative embodiments, part or all of the baseband processing circuitry 1022 and application processing circuitry 1023 may be combined into one chipset, and the RF transceiver circuitry 1021 may be on a separate chipset. In still alternative embodiments, part or all of the RF transceiver circuitry 1021 and baseband processing circuitry 1022 may be on the same chipset, and the application processing circuitry 1023 may be on a separate chipset. In yet other alternative embodiments, part or all of the RF transceiver circuitry 1021, baseband processing circuitry 1022, and application processing circuitry 1023 may be combined in the same chipset. Processing circuitry 1020 may include, for example, one or more central processing units (CPUs), one or more microprocessors, one or more application specific integrated circuits (ASICs), and/or one or more field programmable gate arrays (FPGAs).

The radio network node 200 may include a power source 1050. The power source 1050 may be a battery or other power supply circuitry, as well as power management circuitry. The power supply circuitry may receive power from an external source. A battery, other power supply circuitry, and/or power management circuitry are connected to radio circuitry (e.g. radio front-end circuitry) 1010, processing circuitry 1020, and/or memory 1030. The power source 1050, battery, power supply circuitry, and/or power management circuitry are configured to supply radio network node 200, including processing circuitry 1020, with power for performing the functionality described herein.

Figure 8B:
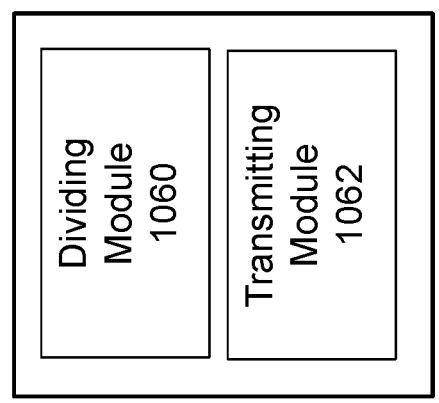
FIG. 8B is a block diagram illustrating example components of a network node.

FIG. 8B is a block diagram illustrating example components of a network node. The components may include dividing module 1060 and transmitting module 1062.

Dividing module 1060 may perform the dividing functions of network node 200. For example, dividing module 1060 may divide system information or a synchronization signal into a number (N) of transmission blocks in a frequency domain, according to any of the embodiments or examples described above (e.g., step 612 at FIG. 6). In certain embodiments, dividing module 1060 may include or be included in processing circuitry 1020. In particular embodiments, dividing module 1060 may communicate with transmitting module 1062.

Transmitting module 1062 may perform the transmitting functions of network node 200. For example, transmitting module 1062 may transmit a plurality of subframes to a user wireless device, each subframe of the plurality of subframes including a repetition of the N transmission blocks in the frequency domain, according to any of the embodiments or examples described above (e.g., step 614 at FIG. 6). In certain embodiments, transmitting module 1062 may include or be included in processing circuitry 1020. In particular embodiments, transmitting module 1062 may communicate with dividing module 1060.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP Third Generation Partnership Project
BTS Base Transceiver Station
CRS Cell Reference Symbols
D2D Device to Device
DCF Distributed Coordination Function
DL Downlink
DTX Discontinuous Transmission
eMTC enhanced MTC
eNB eNodeB
FDD Frequency Division Duplex
HARQ Hybrid Automatic Repeat Request
IoT Internet of Things
LTE Long Term Evolution
MAC Medium Access Control
MBSFN Multimedia Broadcast Single Frequency Network
M2M Machine to Machine
MIB Master Information Block
MIMO Multi-Input Multi-Output
MTC Machine Type Communication
NB Narrowband
NB-IoT NB Internet of Things
NDLSCH NB Downlink Shared Channel
NPBCH NB Physical Broadcast Channel
NPRACH NB Physical Random Access Channel
NPSS NB Primary Synchronization Signal
NR New Radio
NRS NB Reference Symbols NSSS NB Secondary Synchronization Signal
PBCH Physical Broadcast Channel
PDCCH Physical Downlink Control Channel
PDSCH Physical Downlink Shared Channel
PUCCH Physical Uplink Control Channel
PO Paging occasion
PF Paging frame
PRB Physical Resource Block
RAN Radio Access Network
RAT Radio Access Technology
RB Radio Bearer
RBS Radio Base Station
RNC Radio Network Controller
RRC Radio Resource Control
RRH Remote Radio Head
RRU Remote Radio Unit
RV Redundancy Version
SI System Information
SIB System Information Block
TDD Time Division Duplex
TTI Transmission Time Interval
UE User Equipment
UL Uplink
UTRAN Universal Terrestrial Radio Access Network
WAN Wireless Access Network

The invention claimed is:

1. A method for use in a user equipment (UE) of acquiring system information or a synchronization signal, the method comprising:
receiving, from a network node, a plurality of subframes, wherein each subframe of the plurality of subframes includes a repetition of either system information or a synchronization signal, the repetition of the system information or synchronization signal is divided into a number (N) of transmission blocks in a frequency domain of a first bandwidth, wherein
N is an integer greater than one;
the system information or synchronization signal is provided over a bandwidth wider than an operating range of the UE;
receiving the plurality of subframes comprises acquiring at least a portion of the system information or synchronization signal from outside of the operating range of the UE; and
the plurality of subframes comprises at least two non-consecutive subframes separated by a network discontinuous transmission period;
detecting, from the repetition of the system information or synchronization signal, the minimum system information or synchronization signal, wherein the minimum system information or synchronization signal comprises one instance of each of the N transmission blocks that the system information or synchronization signal is divided to; and
combining the one instance of each transmission block of N transmission blocks from one or more repetitions of the respective received plurality of subframes to decode the minimum system information or synchronization signal.

2. The method of claim 1, wherein the UE comprises a wideband wireless device operable to receive a bandwidth equal to or greater than the first bandwidth, and combining the one instance of each transmission block of N transmission blocks to decode the minimum system information or synchronization signal comprises combining the one instance of each transmission block of N transmission blocks of one repetition of one respective subframe of the plurality of subframes.

3. The method of claim 1, wherein the UE comprises a narrowband wireless device operable to receive a bandwidth less than the first bandwidth, and combining the one instance of each transmission block of N transmission blocks to decode the minimum system information or synchronization signal comprises combining one instance of each transmission block from two or more repetitions of two or more respective subframes of the plurality of subframes.

4. The method of claim 3, wherein each repetition of the minimum system information or synchronization signal includes one instance of each N transmission blocks in the same position within the frequency domain, and combining one instance of each transmission block from two or more repetitions of two or more respective subframes of the plurality of subframes comprises frequency hopping in the plurality of subframes until the UE receives all N transmission blocks in the frequency domain.

5. The method of claim 4, wherein combining one instance of each transmission block from two or more repetitions of two or more respective subframes of the plurality of subframes comprises frequency hopping over N subframes in the plurality of subframes and combining one transport block from each of the N subframes.

6. The method of claim 3, wherein repetitions of the minimum system information or synchronization signal include the N transmission blocks in a different order within the frequency domain, and combining one instance of each transmission block from two or more repetitions of two or more respective subframes of the plurality of subframes comprises combining transmission blocks at a same frequency for each subframe of the plurality of subframes until the UE receives all N of the transmission blocks in the frequency domain, such that the UE does not need to perform frequency hopping to receive each transmission block from different subframes.

7. The method of claim 6, wherein combining one instance of each transmission block from two or more repetitions of two or more respective subframes of the plurality of subframes comprises combining one instance of each transmission block at the same frequency in each of N subframes of the plurality of subframes.

8. A user equipment (UE) capable of acquiring system information or a synchronization signal, the UE comprising processing circuitry operable to:
receive, from a network node, a plurality of subframes, wherein each subframe of the plurality of subframes includes a repetition of either system information or a synchronization signal, the repetition of the system information or synchronization signal is divided into a number (N) of transmission blocks in a frequency domain of a first bandwidth, wherein
N is an integer greater than one;
the system information or synchronization signal is provided over a bandwidth wider than an operating range of the UE;
processing circuitry operable to receive the plurality of subframes comprises processing circuitry operable to acquire at least a portion of the system information or synchronization signal from outside of the operating range of the UE; and
the plurality of subframes comprises at least two non-consecutive subframes separated by a network discontinuous transmission period;

detect, from the repetition of the system information or synchronization signal, the minimum system information or synchronization signal, wherein the minimum system information or synchronization signal comprises one instance of each of the transmission blocks that the system information or synchronization signal is divided to; and combine the one instance of each transmission block of N transmission blocks from one or more repetitions of the respective received plurality of subframes to decode the minimum system information or synchronization signal.

9. The UE of claim 8, wherein the UE comprises a wideband wireless device operable to receive a bandwidth equal to or greater than the first bandwidth, and the processing circuitry is operable to combine the one instance of each transmission block of N transmission blocks to decode the minimum system information or synchronization signal by combining the one instance of each transmission block of N transmission blocks of one repetition of one respective subframe of the plurality of subframes.

10. The UE of claim 8, wherein the UE comprises a narrowband wireless device operable to receive a bandwidth less than the first bandwidth, and the processing circuitry is operable to combine the one instance of each transmission block of N transmission blocks to decode the minimum system information or synchronization signal by combining one instance of each transmission block from two or more repetitions of two or more respective subframes of the plurality of subframes.

11. The UE of claim 10, wherein each repetition of the minimum system information or synchronization signal includes one instance of each N transmission blocks in the same position within the frequency domain, and the processing circuitry is operable to combine one instance of each transmission block from two or more repetitions of two or more respective subframes of the plurality of subframes by frequency hopping in the plurality of subframes until the UE receives all N transmission blocks in the frequency domain.

12. The UE of claim 11, wherein the processing circuitry is operable to combine one instance of each transmission block from two or more repetitions of two or more respective subframes of the plurality of subframes by frequency hopping over N subframes in the plurality of subframes and combining one transport block from each of the N subframes.

13. The UE of claim 10, wherein repetitions of the minimum system information or synchronization signal include the N transmission blocks in a different order within the frequency domain, and the processing circuitry is operable to combine one instance of each transmission block from two or more repetitions of two or more respective subframes of the plurality of subframes by combining transmission blocks at a same frequency for each subframe of the plurality of subframes until the UE receives all N of the transmission blocks in the frequency domain, such that the UE does not need to perform frequency hopping to receive each transmission block from different subframes.

14. The UE of claim 13, wherein the processing circuitry is operable to combine one instance of each transmission block from two or more repetitions of two or more respective subframes of the plurality of subframes by combining one instance of each transmission block at the same frequency in each of N subframes of the plurality of subframes.

15. The UE of claim 8, wherein the plurality of subframes comprises consecutive subframes.

16. The UE of claim 8, wherein the minimum system information includes at least one of a master information block (MIB) and a system information block (SIB).

17. The UE of claim 8, wherein the synchronization signal includes at least one of a primary synchronization signal (PSS) and a secondary synchronization signal (SSS).

18. A method for use in a network node of transmitting system information or synchronization signals, the method comprising:

dividing system information or a synchronization signal into a number (N) of transmission blocks in a frequency domain, wherein the minimum system information or synchronization signal comprises one instance of each of the N transmission blocks that the system information or synchronization signal is divided to; and transmitting a plurality of subframes to a user equipment (UE), each subframe of the plurality of subframes including a repetition of the N transmission blocks in the frequency domain for the UE to detect, from the repetition of the N transmission blocks, the minimum system information or synchronization signal, and combine the one instance of each of the N transmission blocks to decode the minimum system information or synchronization signal, wherein the system information or synchronization signal is provided over a bandwidth wider than an operating range of the UE;

transmitting the plurality of subframes comprises transmitting at least a portion of the system information or synchronization signal from outside of the operating range of the UE; and the plurality of subframes comprises at least two non-consecutive subframes separated by a network discontinuous transmission period.

19. A network node capable of transmitting system information or synchronization signals, the network node comprising processing circuitry operable to:

divide system information or a synchronization signal into a number (N) of transmission blocks in a frequency domain, wherein the minimum system information or synchronization signal comprises one instance of each of the N transmission blocks that the system information or synchronization signal is divided to; and transmit a plurality of subframes to a user equipment (UE), each subframe of the plurality of subframes including a repetition of the N transmission blocks in the frequency domain for the UE to detect, from the repetition of the N transmission blocks, the minimum system information or synchronization signal, and combine the one instance of each of the N transmission blocks to decode the minimum system information or synchronization signal, wherein the system information or synchronization signal is provided over a bandwidth wider than an operating range of the UE;

processing circuitry operable to transmit the plurality of subframes comprises processing circuitry operable to transmit at least a portion of the system information or synchronization signal from outside of the operating range of the UE; and the plurality of subframes comprises at least two non-consecutive subframes separated by a network discontinuous transmission period.

20. The network node of claim 19, wherein each repetition of the minimum system information or synchronization signal includes the N transmission blocks in the same order within the frequency domain.

21. The network node of claim 18, wherein each repetition of the minimum system information or synchronization signal includes the N transmission blocks in a different order within the frequency domain.

22. The network node of claim 19, wherein each transmission block of the N transmission blocks in the frequency domain for one repetition includes a different identifier.

23. The network node of claim 22, wherein the identifier comprises a hybrid automatic repeat request (HARQ) incremental redundancy version.

24. The network node of claim 19, wherein the plurality of subframes comprises consecutive subframes.

25. The network node of claim 19, wherein the system information includes at least one of a master information block (MIB) and a system information block (SIB).

26. The network node of claim 19, wherein the synchronization signal includes at least one of a primary synchronization signal (PSS) and a secondary synchronization signal (SSS).

* * * * *